Patented Sept. 18, 1951

2,568,025

UNITED STATES PATENT OFFICE 2,568,025

PROCESS FOR THE PRODUCTION OF
7-HALOGENOSTEROLS

Siegfried Pickholz, Greenford, and Evan Roberts, London, England, assignors to Peboc Limited, Greenford, England, a British company No Drawing. Application March 20, 1950, Serial No. 150,814. In Great Britain March 24, 1949

14 Claims. (Cl. 260—397.2)

This invention relates to improvements in the production of sterols having a halogen atom in the 7-position, a double bond in the 5.6-position and a saturated open chain hydrocarbon residue in the 17-position.

It is known (see for example, British patent specification No. 574,432 and copending application Serial No. 132,203 filed December 9, 1949), that sterols containing a halogen atom in the 7-position and a double bond in the 5.6-position can be dehydrohalogenated to produce 7-dehydrosterols. 7-dehydrocholesterol which may be thus obtained is invaluable as a vitamin precursor. It is thus a matter of considerable importance to be able to produce 7-halogenosterols having a double bond in the 5.6-position smoothly and in good yield.

The known method for producing 7-halogenosterols depends upon the reaction discovered by K. Ziegler, Annalon, volume 551, pages 80 et seq. (1942) which is usually referred to as the Ziegler reaction. The Ziegler reaction depends upon the fact that certain compounds containing an active halogen atom viz. the N-chloroand bromo-amides of monocarboxylic acids and the corresponding imides of dicarboxylic acids can be used to halogenate compounds containing a methylene group adjacent to a double bond. A hydrogen atom of such a methylene group is replaced by the corresponding halogen.

It has been pointed out that in the case of a sterol which contains a double bond in the 5.6-position halogenation at the 4- and/or 7-positions is theoretically possible. Only the latter is, however, useful in obtaining the desired 7-dehydrosterols.

It has been realised for some time that unaccountable variations may be encountered during the course of carrying out this halogenation and several expedients have been proposed in efforts to overcome the difficulties that have been noted. Thus the use of specific Ziegler reagents, such as certain substituted N-halogenobenzamides, has been recommended as well as the addition of specific additives, such as cyclohexene, and the catalytic action of light to initiate the reaction. The use of peroxides has also been suggested. Some of these expedients may be capable of giving improved results under certain conditions but, in our experience, they do not appear to be generally applicable or involve working with compounds which themselves are not readily accessible or present other difficulties.

In our experience the essential factor in obtaining a satisfactory yield of 7-halogenosterol is to provide conditions which enable the desired reaction to commence smoothly when the reactants are first brought together and to proceed with moderate rapidity whilst providing conditions which substantially reduce the catalysis of an anionotropic effect i. e. an allylic rearrangement. It has been found that this can be done by introducing into the reaction medium one or more of certain specific organic substances viz. pyridine, an alkyl pyridine, a polyalkylpyridine, an alkyl ester of a pyridine monocarboxylic acid, an amide of such acid, urea or an alkyl ester of carbamic acid.

Accordingly, the present invention provides a process for the production of a 7-halogeno-3-sterol ester having a double bond in the 5.6-position and a saturated open chain hydrocarbon residue in the 17-position which comprises monohalogenating a 3-sterol ester having a double bond in the 5.6-position and an open chain hydrocarbon residue in the 17-position with a Ziegler reagent under substantially non-acid conditions in the presence of pyridine, an alkyl pyridine, a polyalkyl pyridine, an alkyl ester of a pyridine monocarboxylic acid, an amide of a pyridine monocarboxylic acid, urea or an alkyl ester of carbamic acid.

The Ziegler reaction is carried out in an inert medium such as petroleum ether or carbon tetrachloride. The sterol ester having a double bond in the 5.6-position is dissolved therein and at least one of the named substances added, as well as the Ziegler reagent, which is preferably N-bromosuccinimide or N-bromophthalimide. The mixture is then heated under reflux until substantially all the Ziegler reagent has been used up: the reaction will, in general, be complete in not more than 15 minutes and preferably in 4 to 10 minutes.

The action of the named substances seems to be rather specific as substances which are regarded as chemically closely related either give no better yields than those reported in the conventional processes or, in some cases, appear to inhibit halogenation altogether. The above named substances do not appear to react with the Ziegler reagent.

As examples of sterols whose esters may be used there may be mentioned cholesterol, sitosterol and campesterol. The application of the invention in the smooth production of 7-halogenocholesterol in good yield and for direct conversion to 7-dehydrocholesterol is of considerable importance.

The process of the present invention may be combined with the known processes for the production of 7-dehydrosterols such as 7-dehydrocholesterol by dehydrohalogenation or with the improved process described in copending application Serial No. 132,203 filed December 9, 1949, according to which dehydrohalogenation is effected at an elevated temperature in the presence of an acid acceptor and of an ester which is liquid at room temperature, has a boiling point under normal pressure of at least 90° C., is unreactive with the 7-halogenosterol ester, and with the 7-dehydrosterol ester at the temperatures employed and in which the latter is not more than sparingly soluble at room temperature.

The following experiment is illustrative of the known process in which a time lag was observed before the reaction started and there was correspondingly a low yield of 7-dehydrocholesterol.

12 gms. of cholesterol benzoate are dissolved in 110 ml. of petroleum ether (B. P. 60–80° C.) and refluxed for 45 minutes with 5.2 gms. of N-bromo-succinimide, cooled and filtered. Reaction did not seem to commence for about 35 minutes. 6 gms. of sodium carbonate and 60 ml. of ethyl benzoate are added to the filtrate and the petroleum ether distilled off at atmospheric pressure. The dehydrohalogenation is carried out at 125–130° C. for 15 minutes. After cooling 60 ml. of water are added and the mixture is allowed to stand overnight at 0° C. whereupon crystallisation occurs. The solid is filtered off, washed with 25 ml. of water and then with three 10 ml. portions of acetone. Saponification of the solid gave 2.9 gms. of 7-dehydrocholesterol of 40% purity, corresponding to a 12% yield on the cholesterol used.

The following examples illustrate the manner in which the invention may be carried into effect:

*Example 1*

12 gms. of cholesterol benzoate are dissolved in 110 ml. of petroleum ether (B. P. 60–80° C.) to which is added 0.4 ml. of alpha-picoline and refluxed for 10 minutes with 5.2 gms. of N-bromo-succinimide, cooled and filtered. The reaction appeared to commence as soon as the mixture was brought to reflux. 6 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the mixture is allowed to stand overnight at 0° C. whereupon crystallisation occurs. The solid is filtered off, washed with 25 ccs. of water and then with three 10 ml. portions of acetone. Saponification of the solid gave 4.3 gms. of 7-dehydrocholesterol of 90% purity corresponding to a 40% yield on the cholesterol used.

*Example 2*

12.5 gms. of cholesterol benzoate are dissolved in 110 ml. of petroleum ether (B. P. 60–80° C.) and to it is added 5.4 gms. of N-bromo-succinimide, and 0.8 ml. of alpha-picoline. The mixture is refluxed for 12 minutes with vigorous stirring and then allowed to cool. 6 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 4.6 gms. of 7-dehydrocholesterol of 92% purity was obtained, corresponding to a 42% yield on the cholesterol used.

*Example 3*

12 gms. of cholesterol benzoate are dissolved in 100 ml. of carbon tetrachloride to which is added 0.8 ml. of alpha-picoline and refluxed for five minutes with 5.2 gms. of N-bromo-succinimide. The yellow solution is allowed to cool and the succinimide filtered off. 6 gms. of sodium carbonate and 60 ml. of ethyl benzoate are added to the filtrate and the carbon tetrachloride removed under reduced pressure. The dehydrohalogenation is carried out at 125–130° C. for 15 minutes. After cooling 60 ml. of water are added and the product worked up as in Example 1. 3.8 gms. of 7-dehydrocholesterol of 86% purity was obtained, corresponding to a 33.8% yield on the cholesterol used.

*Example 4*

12.5 gms. of cholesterol benzoate are dissolved in 110 ml. of petroleum ether (B. P. 60–80° C.) and to it is added 5.4 gms. of N-bromo-succinimide and 0.8 ml. of pyridine, refluxed for 12 minutes, cooled and filtered. 6 gms. of sodium carbonate and 60 ml. of ethyl benzoate are added to the filtrate and the petroelum ether distilled off at atmospheric pressure. The dehydrohalogenation is carried out at 130° C. for 15 minutes. After cooling 60 ml. of water are added and the product worked up as in Example 1. 3.5 gms. of 7-dehydrocholesterol of 92% purity is obtained, corresponding to a 32% yield on the cholesterol used.

*Example 5*

12.5 gms. of cholesterol benzoate are dissolved in 110 ml. of petroleum ether (B. P. 60–80° C.) and to it is added 5.4 gms. of N-bromo-succinimide, and 1.2 ml. of ethyl picolinate the mixture refluxed for 12 minutes, cooled and filtered. The dehydrohalogenation was carried out with 6.5 gms. of sodium carbonate in 60 ml. of ethyl benzoate at 125–130° C. for 15 minutes. After cooling 60 ml. of water are added and the product worked up as in Example 1. 5.3 gms. of 7-dehydrocholesterol of 63% purity is obtained, corresponding to a 33% yield on the cholesterol used.

*Example 6*

12.5 gms. of cholesterol benzoate are dissolved in 110 ml. of petroleum ether (B. P. 60–80° C.) and to it is added 5.4 gms. of N-bromo-succinimide and 1.3 gms. of urea, the mixture refluxed for 12 minutes, cooled and filtered. 6 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 3.6 gms. of 7-dehydrocholesterol, of 70% purity is obtained corresponding to a 25% yield on the cholesterol used.

*Example 7*

12.5 gms. of cholesterol benzoate are dissolved in 110 ml. of petroleum ether (B. P. 60–80° C.) and to it is added 5.4 gms. of N-bromo-succinimide and 1.5 gms. of nicotinamide, the mixture refluxed for 12 minutes, cooled and filtered. The dehydrohalogenation was carried out with 6.5 gms. of sodium carbonate in 60 ml. of ethyl benzoate at 125–130° C. for 15 minutes. After cooling 60 ml. of water are added and the product worked up as in Example 1. 4.6 gms. of 7-dehydrocholesterol of 78% purity is obtained, corresponding to a 35.5% yield on the cholesterol used.

Example 8

12.5 gms. of cholesterol benzoate are dissolved in 110 ml. of petroleum ether (B. P. 60-80° C.) and to it is added 5.4 gms. of N-bromo-succinimide and 1.5 ml. of ethyl nicotinate the mixture refluxed for 12 minutes, cooled and filtered. The dehydrohalogenation was carried out with 6.5 gms. of sodium carbonate in 60 ml. of ethyl benzoate at 125-130° C. for 15 minutes. After cooling 60 ml. of water are added and the product worked up as in Example 1. 4.8 gms. of 7-dehydrocholesterol of 76% purity is obtained, corresponding to a 36.1% yield on the cholesterol used.

Example 9

12.5 gms. of cholesterol benzoate are dissolved in 100 ml. of petroleum ether (B. P. 80-100° C.) and to it is added 5.4 gms. of N-bromo-succinimide and 1.2 ml. of beta-picoline. The mixture is refluxed for 4 minutes, cooled and filtered. 6.5 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the mixture is allowed to stand overnight at 0° C. whereupon crystallisation occurs. The solid is filtered off, washed with 25 ccs. of water and then with three 10 ml. portions of methanol. Saponification of the solid gave 2.9 gms. of 7-dehydrocholesterol of 69% purity, corresponding to a 20.3% yield on the cholesterol used.

Example 10

12.5 gms. of cholesterol benzoate are dissolved in 100 ml. of petroleum ether (B. P. 80-100° C.) and to it is added 5.4 gms. of N-bromo-succinimide and 1.2 ml. of gamma-picoline. The mixture is refluxed for 4 minutes, cooled and filtered. 6.5 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 3.0 gms. of 7-dehydrocholesterol of 70% purity was obtained, corresponding to a 21.0% yield on the cholesterol used.

Example 11

12.5 gms. of cholesterol benzoate are dissolved in 115 ml. of petroleum ether (B. P. 60-80° C.) and to it is added 5.4 gms. of N-bromo-succinimide and 1.2 ml. of gamma-picoline. The mixture is refluxed for 15 minutes, cooled and filtered. 6.5 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 4.2 gms. of 7-dehydrocholesterol of 23% purity was obtained, corresponding to a 9.7% yield on the cholesterol used.

Example 12

12.5 gms. of cholesterol benzoate are dissolved in 115 ml. of petroleum ether (B. P. 60-80° C.) and to it is added 5.4 gms. of N-bromosuccinimide and 1.5 ml. of symcollidine. The mixture is refluxed for 40 minutes, cooled and filtered. 6.5 gms. of sodium carbonate and 60 ml. of ethyl benzoate added to the filtrate and the petroleum ether distilled off at atmospheric pressure. The dehydrohalogenation is carried out at 130° C. for 15 minutes. After cooling 60 ml. of water are added and the product worked up as in Example 1. 4.4 gms. of 7-dehydrocholesterol of 70% purity was obtained, corresponding to a 30.8% yield on the cholesterol used.

Example 13

12.5 gms. of cholesterol benzoate are dissolved in 100 ml. of petroleum ether (B. P. 80-100° C.) and to it is added 5.4 gms. of N-bromo-succinimide and 1.5 ml. of symcollidine. The mixture is refluxed for 6 minutes, cooled and filtered. 6.5 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 4.7 gms. of 7-dehydrocholesterol of 80% purity was obtained, corresponding to a 37.6% yield on the cholesterol used.

Example 14

12.5 gms. of cholesterol benzoate are dissolved in 110 ml. of petroleum ether (B. P. 60-80° C.) and to it is added 5.4 gms. of N-bromo-succinimide and 1.5 gms. of urethane. The mixture is refluxed for 15 minutes, cooled and filtered. 6 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 3.4 gms. of 7-dehydrocholesterol of 74% purity was obtained, corresponding to a 25.1% yield on the cholesterol used.

Example 15

12.5 gms. of cholesterol benzoate are dissolved in 110 ml. of petroleum ether (B. P. 60-80° C.) and to it is added 6.8 gms. of N-bromo-phthalimide and 1.0 ml. alpha-picoline. The mixture is refluxed for 12 minutes, cooled and filtered. 6.5 gms. of sodium carbonate and 60 ml. of ethyl benzoate are added to the filtrate and the petroleum ether distilled off at atmospheric pressure. The dehydrohalogenation is carried out at 130° C. for 15 minutes. After cooling 60 ml. of water are added and the product worked up as in Example 1. 4.9 gms. of 7-dehydrocholesterol of 78% purity was obtained corresponding to a 36.4% yield on the cholesterol used.

Example 16

11.0 gms. of cholesterol acetate are dissolved in 100 ml. of petroleum ether (B. P. 60-80° C.) and to it is added 5.4 gms. of N-bromo-succinimide and 1.0 ml. of alpha-picoline. The mixture is refluxed for 12 minutes, cooled and filtered. 6.5 gms. of sodium carbonate and 60 ml. of dimethyl phthalate are added to the filtrate and the petroleum ether distilled off at atmospheric pressure. The dehydrohalogenation is carried out at 130° C. for 15 minutes. After cooling 60 ml. of water are added and the product worked up as in Example 1. 3.6 gms. of 7-dehydrocholesterol of 85% purity was obtained, corresponding to a 30.6% yield on the cholesterol used.

Example 17

11.0 gms. of cholesterol acetate are dissolved in 100 ml. of petroleum ether (B. P. 60-80° C.) and to it is added 6.8 gms. of N-bromo-phthalimide and 1.0 ml. of alpha-picoline. The mixture is refluxed for 12 minutes, cooled and filtered. 6.5 gms. of sodium carbonate and 60 ml. of dimethyl phthalate are added to the filtrate and the petroleum ether distilled off at atmospheric pressure. The dehydrohalogenation is carried out at 130° C. for 15 minutes. After cooling 60 ml. of water are added and the product worked up as in Example 1. 3.4 gms. of 7-dehydrocholesterol of 82% purity was obtained, corresponding to 27.9% yield on the cholesterol used.

In the above examples the yield of 7-dehydrosterol under similar conditions of dehydrohalogenation is taken as providing a measure of the success of the bromination in the correct position. The degree of purity and the overall yield are two factors of considerable importance when the product is subsequently to be subjected to irradiation. It will be noted that when the bromination procedure is carried out in accordance with the present invention and the dehydrohalogenation in accordance with that of copending application Serial No. 132,203 filed December 9, 1949, yields of the 7-dehydrosterol (based on the sterol used) as high as 30–40% with an overall purity of 90% and even higher can be obtained. From this point of view, the use of alpha-picoline has much to commend it.

In general the amount of added substance is less than one mol based upon the sterolester employed: it is preferred to have present 0.2–0.5 mol of the added substance for each mol of the 3-sterol ester.

Some excess of the Ziegler reagent may be employed. This may be as much as 20–30% based upon the sterol ester.

It has been noted that alpha-picoline is the preferred base for use in the process of the present invention. The use of thiourea, quinoline and quinaldine gave products from which about 70% of unchanged sterol ester could be recovered and very little 7-dehydrocholesterol was separated. Guanidine carbonate, dicyandiamide and hexamethylene tetramine behaved similarly whilst dimethylaniline, acetonitrile, nicotine and triethylamine react preferentially with the Ziegler reagent.

1. A process for the production of a 7-halogeno-3-sterol ester having a double bond in the 5.6-position and a saturated open chain hydrocarbon residue in the 17-position which comprises mono-halogenating a 3-sterol ester having a double bond in the 5.6-position and a saturated open chain hydrocarbon residue in the 17-position with a halogenating agent selected from the group consisting of N-chloro and N-bromo carboxylic acid amides and imides under substantially non-acid conditions in the presence of a substance selected from the group consisting of pyridine, alkyl pyridines, polyalkylpyridines, alkyl esters of pyridine monocarboxylic acids, amides of pyridine monocarboxylic acids, urea and alkyl esters of carbamic acid.

2. A process for the production of a 7-halogeno-3-sterol ester having a double bond in the 5.6-position and a saturated open chain hydrocarbon residue in the 17-position which comprises mono-halogenating a 3-sterol ester having a double bond in the 5.6-position and a saturated open chain hydrocarbon residue in the 17-position with a halogenating agent selected from the group consisting of N-chloro and N-bromo carboxylic acid amides and imides under substantially non-acid conditions in the presence of 0.2 to 0.5 mol for each mol of 3-sterol ester of a substance selected from the group consisting of pyridine, alkyl pyridines, polyalkylpyridines, alkyl esters of pyridine monocarboxylic acids, amides of pyridine monocarboxylic acids, urea and alkyl esters of carbamic acid.

3. The process according to claim 2 in which an excess of a halogenating agent selected from the group consisting of N-chloro and N-bromo carboxylic acid amides and imides, based upon the 3-sterol ester, is employed.

4. A process for the production of a 7-halogeno-3-sterol ester having a double bond in the 5.6-position and a saturated open chain hydrocarbon residue in the 17-position which comprises mono-halogenating a 3-sterol ester having a double bond in the 5.6-position and an open chain hydrocarbon residue in the 17-position with a halogenating agent selected from the group consisting of N-chloro and N-bromo carboxylic acid amides and imides under substantially non-acid conditions in the presence of 0.2–0.5 mol of alpha-picoline for each mol of the 3-sterol ester.

5. A process for the production of a 7-halogeno-3-sterol ester having a double bond in the 5.6-position and a saturated open chain hydrocarbon residue in the 17-position which comprises mono-halogenating a 3-sterol ester having a double bond in the 5.6-position and an open chain hydrocarbon residue in the 17-position with a halogenating agent selected from the group consisting of N-chloro and N-bromo carboxylic acid amides and imides under substantially non-acid conditions in the presence of 0.2–0.5 mol of pyridine for each mol of the 3-sterol ester.

6. A process for the production of a 7-halogeno-3-sterol ester having a double bond in the 5.6-position and a saturated open chain hydrocarbon residue in the 17-position which comprises mono-halogenating a 3-sterol ester having a double bond in the 5.6-position and an open chain hydrocarbon residue in the 17-position with a halogenating agent selected from the group consisting of N-chloro and N-bromo carboxylic acid amides and imides under substantially non-acid conditions in the presence of 0.2–0.5 mol of ethyl nicotinate for each mol of the 3-sterol ester.

7. A process for the production of a 7-halogeno-3-sterol ester having a double bond in the 5.6-position and a saturated open chain hydrocarbon/residue in the 17-position which comprises mono-halogenating a 3-sterol ester having a double bond in the 5.6-position and an open chain hydrocarbon residue in the 17-position with a halogenating agent selected from the group consisting of N-chloro and N-bromo carboxylic acid amides and imides under substantially non-acid conditions in the presence of 0.2–0.5 mol of ethyl picolinate for each mol of the 3-sterol ester.

8. A process for the production of a 7-halogeno-3-sterol ester having a double bond in the 5.6-position and a saturated open chain hydrocarbon residue in the 17-position which comprises mono-halogenating a 3-sterol ester having a double bond in the 5.6-position and an open chain hydrocarbon residue in the 17-position with a halogenating agent selected from the group consisting of N-chloro and N-bromo carboxylic acid amides and imides under substantially non-acid conditions in the presence of 0.2–0.5 mol of symmetrical collidine for each mol of the 3-sterol ester.

9. A process for the production of a 7-halogeno-3-sterol ester having a double bond in the 5.6-position and a saturated open chain hydrocarbon residue in the 17-position which comprises heating a 3-sterol ester having a double bond in the 5.6-position and a saturated open chain hydrocarbon residue in the 17-position with a halogenating agent selected from the group consisting of N-chloro and N-bromo carboxylic acid amides and imides under substantially non-acid conditions in the presence of not more than 0.5 mol for each mol of sterol ester of a substance selected from the group consisting of pyridine, alkyl pyridines, polyalkylpyridines, alkyl esters of pyridine monocarboxylic acids, amides of pyridine monocarboxylic acids, urea and alkyl esters of carbamic acid.

10. A process for the production of a 7-halogeno-3-sterol ester having a double bond in the 5.6-position and a saturated open chain hydrocarbon residue in the 17-position which comprises heating a 3-sterol ester having a double bond in the 5.6 position and a saturated open chain hydrocarbon residue in the 17-position with a halogenating agent selected from the group consisting of N-chloro and N-bromo carboxylic acid amides and imides under substantially non-acid conditions in the presence of not more than 0.5 mol for each mol of sterol ester of alpha-picoline.

11. A process for the production of a 7-halogeno-3-sterol ester having a double bond in the 5.6-position and a saturated open chain hydrocarbon residue in the 17-position which comprises heating a 3-sterol ester having a double bond in the 5.6-position and a saturated open chain hydrocarbon residue in the 17-position with a halogenated agent selected from the group consisting of N-chloro and N-bromo carboxylic acid amides and imides under substantially non-acid conditions in the presence of not more than 0.5 mol for each mol of sterol ester of pyridine.

12. A process for the production of a 7-halogeno-3-sterol ester having a double bond in the 5.6-position and a saturated open chain hydrocarbon residue in the 17-position which comprises heating a 3-sterol ester having a double bond in the 5.6-position and a saturated open chain hydrocarbon residue in the 17-position with a halogenating agent selected from the group consisting of N-chloro and N-bromo carboxylic acid amides and imides under substantially non-acid conditions in the presence of not more than 0.5 mol for each mol of sterol ester of ethyl nicotinate.

13. A process for the production of a 7-halogeno-3-sterol ester having a double bond in the 5.6-position and a saturated open chain hydrocarbon residue in the 17-position which comprises heating a 3-sterol ester having a double bond in the 5.6-position and a saturated open chain hydrocarbon residue in the 17-position with a halogenating agent selected from the group consisting of N-chloro and N-bromo carboxylic acid amides and imides under substantially non-acid conditions in the presence of not more than 0.5 mol for each mol of sterol ester of ethyl picolinate.

14. A process for the production of a 7-halogeno-3-sterol ester having a double bond in the 5.6-position and a saturated open chain hydrocarbon residue in the 17-position which comprises heating a 3-sterol ester having a double bond in the 5.6-position and a saturated open chain hydrocarbon residue in the 17-position with a halogenating agent selected from the group consisting of N-chloro and N-bromo carboxylic acid amides and imides under substantially non-acid conditions in the presence of not more than 0.5 mol for each mol of sterol ester of symmetrical collidine.

SIEGFRIED PICKHOLZ.
EVAN ROBERTS.

REFERENCES CITED

The following references are of record in the file of this patent:

UNITED STATES PATENTS

| Number | Name | Date |
|---|---|---|
| 2,498,390 | Bernstein | Feb. 21, 1950 |